United States Patent [19]
Sakai et al.

[11] Patent Number: 5,988,655
[45] Date of Patent: Nov. 23, 1999

[54] VEHICULAR HEIGHT ADJUSTING DEVICE

[75] Inventors: Shizuka Sakai; Seiichiro Komatsu, both of Gifu, Japan

[73] Assignee: Kayaba Kogyo Kabushiki Kaisha, Tokyo, Japan

[21] Appl. No.: 08/964,280

[22] Filed: Nov. 4, 1997

[51] Int. Cl.[6] .................................................. B60G 17/044
[52] U.S. Cl. ............................. 280/6.159; 280/124.159; 267/64.17; 267/DIG. 2
[58] Field of Search ................................ 280/6.15, 6.151, 280/6.152, 6.159, 124.159, 124.16, 124.161, FOR 165, FOR 166, FOR 171; 267/64.17, DIG. 2; 188/322.14, 318

[56] References Cited

U.S. PATENT DOCUMENTS

| | | | |
|---|---|---|---|
| 2,802,664 | 8/1957 | Jackson | 267/64.17 |
| 3,554,525 | 1/1971 | De Koning et al. | 267/64.17 |
| 3,593,978 | 7/1971 | Lohr | 267/64.17 |
| 4,577,840 | 3/1986 | Meller et al. | 267/64.17 |

*Primary Examiner*—Paul N. Dickson
*Attorney, Agent, or Firm*—McGlew and Tuttle, P.C.

[57] ABSTRACT

According to the present invention there is provided a vehicular height adjusting device capable of diminishing a shock caused by a sudden change in pressure of an accumulator oil chamber at the time of adjusting the vehicular height to adjust the vehicular height in a gentle manner and capable of diminishing a beat noise of an opening/closing valve generated by the vehicular height adjusting operation, thereby improving the comfortableness.

5 Claims, 3 Drawing Sheets

VEHICULAR HEIGHT ADJUSTING DEVICE

BACKGROUND OF THE INVENTION

The present invention relates to a vehicular height adjusting device disposed between the body of a vehicle and an axle to damp vibrations from the surface of a road in a normal running condition and capable of controlling the height of the vehicle constant at all times irrespective of a sprung weight.

As for this type of a vehicular height adjusting device, there has been developed, for example, such a device as shown in FIG. 3. In this vehicular height adjusting device, when the vehicle equipped with the device is at its standard height, a control orifice 1C is formed in a position not to be covered with a pump cylinder 11. Upon increase of the sprung weight due to loading of goods for example, a shock absorber S contracts as the vehicular height decreases, and the control orifice 1C and a cutout passage 1B get into the pump cylinder 11. While the vehicle is running, the shock absorber S is vibrated due to unevenness of the surface of a road. In an extension stroke of the shock absorber S in the lowered state of the vehicle height, a hydraulic oil in a rod-side chamber C moves into an antirod-side chamber B through a piston 6 equipped with a damping valve. Then, the hydraulic oil in an amount corresponding to a retracting volume of a pump rod 1 from a pump cylinder 11 leaves a reservoir F, passes through a suction pipe 8, a passage 5A formed in the upper portion of an outer shell 5, then passes through a hollow bore 1A formed inside the pump rod 1, opens an induction valve 9 and is introduced into a pump chamber A of a negative pressure.

In a retracting stroke of the shock absorber S, the hydraulic oil in the pump chamber A is discharged from a discharge valve 13, passes through a passage 11A formed between a piston rod 12 and the pump cylinder 11 and flows into the antirod-side chamber B. With an increase in the amount of oil in the antirod-side chamber B caused by repetition of such a self-pumping action, the oil in the antirod-side chamber B flows through a communication hole 2A formed in a disc plate 2 which seals the upper end of the cylinder 3, then through a passage 3A formed between the cylinder 3 and a cap 4, and enters an oil chamber E. Through a boot 7 serving as a contractible partition wall, the oil chamber E is partitioned from a high-pressure gas chamber D with an inert high-pressure gas sealed therein and serves as an oil chamber of an accumulator formed in the shock absorber S.

As a result of the boot 7 being expanded by the internal pressure of the oil chamber E, the volume of the high-pressure gas chamber D is diminished and the internal pressure thereof increases. Consequently, the pressure of the oil chamber E which balances with the pressure of the high-pressure gas chamber D through the boot 7, as well as the pressure of the antirod-side chamber B in communication with the oil chamber E, also increases, resulting in that the repulsive force of the piston rod 12 increases and the shock absorber S extends in proportion to the increase of the said repulsive force, thus causing the vehicular height to increase. With extension of the shock absorber S, the cutout passage 1B formed by cutting out a part of the outer surface of the pump rod 1 goes out of the pump cylinder 11, so that the pump chamber A and the antirod-side chamber B come into communication with each other through the cutout passage 1B and the foregoing self-pumping action vanishes. Thus, the vehicular height does not increase any further.

Next, as the sprung weight decreases due to unloading for example, the shock absorber S extends under the repulsive force of the piston rod 12 and at a speed buffered by the piston 6 equipped with a damping valve, the piston 6 being mounted to the upper end of the piston rod 12. As a result, the control orifice 1C goes out of the pump cylinder 11. During the period from this condition up to the time when the control orifice 1C enters and is closed with the pump cylinder 11, the hydraulic oil in the antirod-side chamber B passes through the control orifice 1C, then through the hollow bore 1A formed inside the pump rod 1 and further through the suction pipe 8, and is returned to a reservoir F, so that the internal pressure of the antirod-side chamber B decreases and the repulsive force of the piston rod 12 also decreases. Consequently, the vehicular height lowers to its standard height.

Numeral 10 denotes a rod guide. The cylinder 3 is fitted on a stepped upper-end portion of a small diameter of the rod guide 10, while the boot 7 is fitted on a stepped large-diameter portion of the rod guide 10. Seals 15 and 16 are mounted inside the rod guide 10 at two stages. The piston rod 12 is guided slidably by means of a bushing 17 which is press-fitted in the lower end portion of the rod guide 10. Numeral 14 denotes a clamping nut for fixing the rod guide 10 to the outer shell 5. Numeral 18 denotes a dust boot for protecting the piston rod from dust.

In the above conventional vehicular height adjusting device, the high-pressure gas chamber D of the accumulator is formed inside the cylinder 5 whose outer diameter is constant and hence its volume is restricted, there has been a problem such that it is difficult to diminish a shock caused by a sudden change in pressure of the oil chamber E at the time of vehicular height adjustment and thereby gently adjust the vehicular height. There also has been a problem such that a beat noise generated at the time of opening and closing of the induction valve and the discharge valve in the vehicular height adjusting motion which is repeated frequently.

SUMMARY OF THE INVENTION

Accordingly, it is an object of the present invention to provide a vehicular height adjusting device capable of diminishing a shock caused by a sudden change in pressure of an oil chamber E of an accumulator in vehicular height adjustment, thereby adjusting the vehicular height gently, and capable of diminishing a beat noise of an opening/closing valve generated by a vehicular height adjusting motion, thereby improving the comfortableness.

According to the present invention, for solving the foregoing problems, there is provided a vehicular height adjusting device comprising a shock absorber disposed between a vehicular body and an axle, an accumulator disposed within and in communication with the shock absorber, a pump mechanism for the supply of a pressure oil to both shock absorber and accumulator, and a control orifice formed in the shock absorber to control the height of the shock absorber. The shock absorber is composed of a cylinder, an outer shell disposed outside the cylinder, a reservoir defined between the cylinder and the outer shell, a hollow piston rod inserted into the cylinder movably through a piston valve, and a rod-side oil chamber and an antirod-side chamber which are partitioned from each other through the piston valve in the cylinder. The pump mechanism comprises a pump cylinder disposed in the interior of the piston rod and a hollow pump rod extending upright from the bottom of the cylinder. In an extending and retracting operation, a pressure oil in the reservoir is supplied to both an oil chamber formed on the shock absorber side and an oil chamber formed on the accumulator side, and the control orifice, at a predetermined position thereof, causes the accumulator-side oil chamber to communicate with the reservoir to set the shock absorber at a predetermined height.

According to the first means adopted in the present invention, the pump mechanism operates only in an area wherein a suction port formed on the downstream side of an induction valve located on the upper end side of the pump rod is not closed by the upper end side of the pump cylinder.

According to the second means adopted in the present invention, the base end portion of the pump cylinder inserted into the hollow portion of the piston rod is supported swingably through a plate spring disposed between the lower end face of the piston rod and a lower-end flange portion of a piston nut which is threadedly engaged with the lower end portion of the piston rod.

According to the third means adopted in the present invention, a plate spring is disposed between a collar connected to the outer surface of the lower end of the pump rod which extends upright from a base guide fitted in the bottom of the cylinder and a stopper connected to the upper end portion of the base guide, to hold the pump rod swingably.

Further, a check ball of an induction valve mounted to the upper end portion of the pump rod is fabricated using a non-metallic material such as hard resin or hard rubber to diminish a beat noise of the suction valve generated in the vehicular height adjusting motion. The outer diameter of the outer shell of the shock absorber is expanded up to a value almost equal to the outer diameter of a suspension spring at the portion of the outer shell in which the accumulator is incorporated, thereby enlarging the volume of a gas chamber and diminishing a shock caused by a sudden change in pressure of the accumulator oil chamber in vehicular height adjustment.

DESCRIPTION OF THE INVENTION

DESCRIPTION OF THE PREFERRED EMBODIMENT

Figure 1:
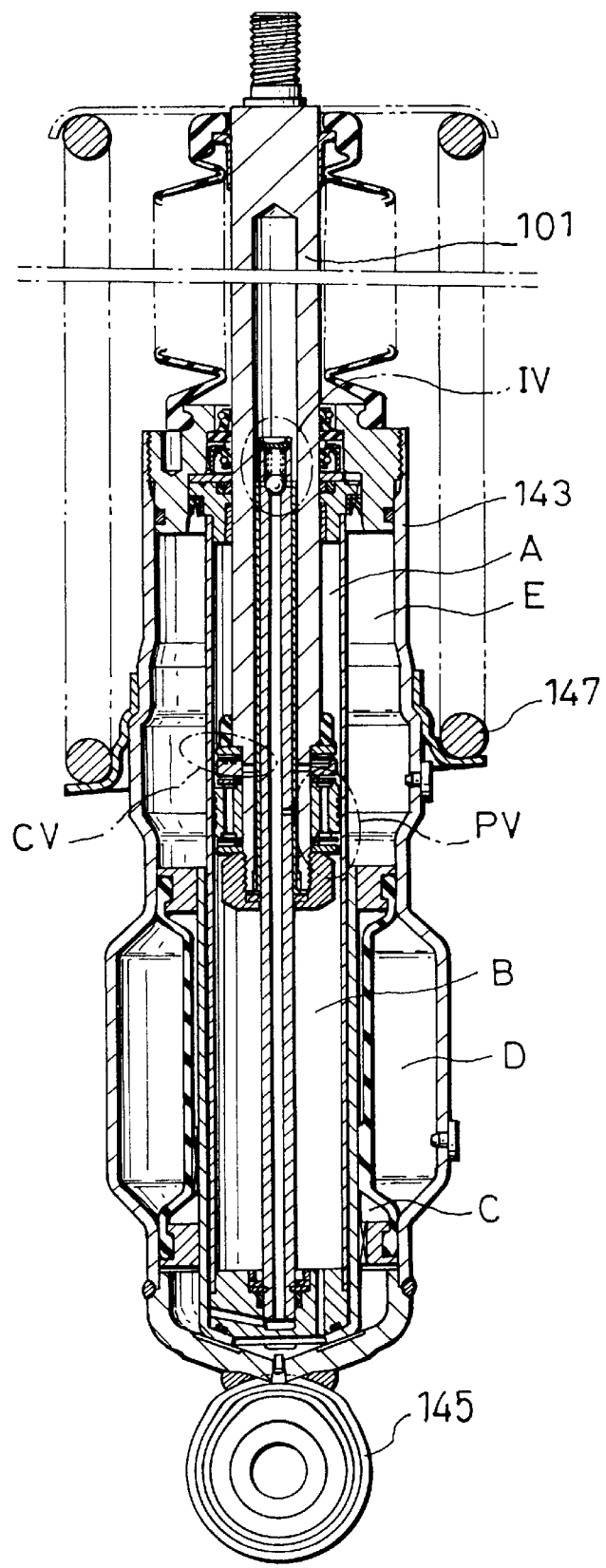
FIG. 1 is a front view in longitudinal section showing the whole of a vehicular height adjusting device embodying the present invention.

A vehicular height adjusting device according to an embodiment of the present invention will be described hereinafter with reference to an entire view of the device shown in FIG. 1 and an enlarged view of a principal portion thereof shown in FIG. 2.

The structure of the vehicular height adjusting device will first be outlined. In the center of the piston rod 101 is formed a hollow bore 101A. A piston valve PV is clamped to a stepped portion 101C formed at the lower end of the piston rod 101. The piston valve PV defines the interior of a cylinder 134 into a rod-side chamber A and an antirod-side chamber B and generates damping forces on both extension side and compression side at the time of extension and retraction of the piston rod 101. The piston valve PV is clamped with a piston nut 112.

A rebound cushion 116 is fitted on a lower end portion of the piston rod and its underside sits on a stopper 102 fitted on the stepped lower end portion 101C. To the underside of the stopper 102 are successively mounted a shim 103 whose outer peripheral portion acts as a support point for deflection of a leaf valve 104, the leaf valve 104, and a spacer 105, to constitute a check valve CV. An open window 105A of the spacer 105 communicates with the pump chamber 101A which is a hollow bore through a communication hole 101B and further through a cylindrical clearance 114A between the hollow bore 101A and the pump cylinder 114, and with the check valve CV opposed thereto there is provided or cut off communication between the rod-side chamber A and the pump chamber 101A.

To the underside of the spacer 105 are mounted a shim 106 whose outer peripheral portion acts as a support point for deflection of a compression-side valve 107, the compression-side valve 107, a piston 106, an extension-side valve 109, a shim 110 whose outer peripheral portion acts as a support point for deflection of the extension-side valve 109, and a valve stopper 111, to constitute the piston valve PV. The piston valve PV is clamped to the stepped portion 101C of the piston rod with the piston nut 112.

At the lower end portion of the hollow bore 101A of the piston rod, with the plate spring 115 such as a wave washer or a coned disc spring held between a flange portion 114B formed at the lower end of the pump cylinder and a flange portion 112A formed at the bottom of the piston nut, the pump cylinder 114 is elastically supported so as to be pivotable about its base end portion as a fulcrum in the cylindrical clearance 114A formed between the outer peripheral surface of the pump cylinder 114 and the hollow bore 101A, thereby absorbing off-center of the piston rod 101 and the pump rod 121 relative to each other and further absorbing falling-down of the piston rod 101 caused by a bending load imposed thereon. A seal 113 is held between by both a back-up ring and a resinous guide, permitting the pivotal motion of the pump cylinder 114.

A base guide 127 is fitted on the lower end portion of the cylinder 134 to define the antirod-side chamber B. In the base guide 127 is fitted the lower end portion as a base end portion of a pump rod 121 having a hollow bore 121A in the center thereof, with a collar 122 such as E ring for example being fitted on the lower end portion of the pump rod. The said base end portion is sealed with a seal 125 and a back-up ring 126. A plate spring 123 such as a wave washer or a coned disc spring is held between the collar 122 and a stopper 124 press-fitted in the base guide 127. With the plate spring 123, the pump rod 121 is elastically supported so as to be pivotable about its base end portion as a fulcrum relative to the base guide 127.

As a result, the pump cylinder 114 supported on the piston rod 101 side and the pump rod 121 supported on the cylinder 134 side are slidably fitted together and are pivotable with respect to each other about their base end portions as fulcrums. Thus, it is possible to prevent the occurrence of galling.

A rod guide 131 is fitted on the upper end portion of the cylinder 134 to define the rod-side chamber A, and a guide bushing 131A, a rod seal 131B and a check seal 131C which permits only the discharge of hydraulic oil from the upper portion of the rod seal to the reservoir E are fitted in the rod guide 131 to not only guide the piston rod 101 slidably but also recycle the hydraulic oil to the reservoir E, the hydraulic oil comprising a lubricating oil collected by an oil seal 133A.

Consequently, the pressure on the oil seal 133A side becomes equal to a low internal pressure of the reservoir E, whereby the friction induced by the sliding motion of the piston rod 101 can be diminished.

A seal plate 132 is placed on the upper surface of the rod guide 131 to inhibit an axial movement of the rod seal 131B and is accommodated in the lower end portion of a packing case 133 together with the rod guide 131. An oil seal 133A and a dust seal 133B are mounted on the inner periphery side of the upper portion of the packing case 133, and a base end portion 135A of a dust boot 135 is fitted in a groove formed on the outer periphery of an upper end projection of the packing case 133, to protect the outer peripheral portion of the piston rod 101. Further, a seal 133E is fitted in the lower end portion of the outer periphery of the packing case 133 and is threadedly engaged with an outer shell 143.

The base guide 127 fitted in the lower end portion of the cylinder 134 is received in a case 141 having a tray-like bottom through a seal 148, and sits concentrically on a lower cap 144 which is integrally connected to the lower end surface of the outer shell 143 by welding for example. A boot guide 141A is integrally connected to the upper portion of the outer periphery of the case 141 by full-circled welding for example, while to the lower end portion of the case 141 is connected a boot guide 141B by, for example, press-fitting or partial welding, the boot guide 141B having a cutout passage formed on the inner periphery side. Holding portions 142A and 142B of the boot 142 are fitted in grooves formed respectively on the outer peripheries of those boot guides and are in engagement with the inner surface of the outer shell 143 to define an accumulator oil chamber C, a gas chamber D and the reservoir E.

A mounting portion 145 for mounting the device to the vehicular wheel side is connected to the lower end portion of the lower cap 144 by welding for example. On the other hand, the outer shell 143 is formed with a large-diameter portion 143C, and a spring sheet 146 is fitted on an upper shoulder portion of the large-diameter portion 143C, with a suspension spring 147 sitting on the spring sheet 146.

In assembling the vehicular height adjusting device shown in FIG. 1, the pump chamber 101A, the rod-side chamber A, the antirod-side chamber B and the accumulator oil chamber C are filled with hydraulic oil, then the components of the device are inserted into the outer shell 143, and the packing case 133 is threadedly engaged with the upper portion of the outer shell in a sealed state. Thereafter, a low-pressure gas is sealed simultaneouly into the interior from inlet ports 143A and 143B. Hydraulic oil is sealed into the reservoir E in an amount sufficient to prevent the entry of gas into the antirod-side chamber B even when the piston rod 101 has extended to the maximum degree.

The operation of the vehicular height adjusting device will be described below.

In the standard vehicular height shown in FIG. 1, the vehicle maintains a certain constant height in a certain loaded condition. Upon unloading from this condition, the vehicular body weight becomes light, so that a repulsive force obtained by multiplying the internal pressure of the antirod-side chamber B by the pressure receiving area of the piston rod 101 overcomes the vehiclar body weight and the piston rod 101 rises slowly at a speed buffered by the piston valve PV.

The pump cylinder 114 also rises together with the piston rod 101 because it is secured to the piston rod 101, and a leveling port 121B formed in the pump rod 121 secured to the outer shell 143 side opens to the antirod-side chamber B. Consequently, the antirod-side chamber B comes into communication with the reservoir E through the leveling port 121B, a hollow pump rod bore 121A, an oil chamber 127C, a communication hole 127A formed in the base guide, and a cylindrical passage 141D formed in the fitting portion between the outer periphery of the cylinder 134 and the inner periphery of the case 141. As a result, the hydraulic oil in the antirod-side chamber B flows out into the reservoir E. The flowing-out of the hydraulic oil continues until the leveling port 121B engages the inner periphery of the pump cylinder 114 to close the outflow passage, so that the height of the vehicular height adjusting device returns to the standard height shown in FIG. 1.

Conversely, when the vehicle which maintains its standard constant height shown in FIG. 1 in a certain loaded condition is further loaded, its body weight becomes heavier, so that the body weight overcomes the repulsive force obtained by multiplying the internal pressure of the antirod-side chamber B by the pressure receiving area of the piston rod 101, thus allowing the piston rod 101 to go down slowly at a speed buffered by the piston valve PV.

The pump cylinder 114 moves down together with the piston rod 101 because it is secured to the piston rod 101, and a suction port 121C formed in the pump rod 121 secured to the outer shell 143 side opens to the rod-side chamber A through the cylindrical passage 114A, a communication hole 101B and the leaf valve 104. At the same time, the suction port 121C opens also to the pump chamber 101A. When the vehicle is allowed to run in this state and the pump rod 121 secured to the outer shell 143 side moves up and down in conformity with unevenness of the surface of a road, the volume of the pump chamber 101A increases during descent of the pump rod 121, so that the hydraulic oil flows from the reservoir E, passes through the cylindrical passage 141D, the communication port 127A, the oil chamber 127C and the hollow bore 121A, and pushes open a check ball 128 which is urged against a spring 129 of a weak set load, whereby the hydraulic oil is supplied to the pump chamber 101A through the suction port 121C.

To be more specific, an induction valve IV which communicates with only the pump chamber 101A from the reservoir E is formed by both the check ball 128 sitting through opening and closing motion on the upper-end opening of the hollow bore 121A and the spring 129 which urges the check ball 128 and which is supported at the upper end thereof by a plug 130 providing a seal for the upper-end opening of the pump rod 121.

Next, during ascent of the pump rod 121, the volume of the pump chamber 101A decreases, so that the check ball 128 closes the hollow bore 121A. Consequently, the hydraulic oil in the pump chamber 101A is compressed and the compressed oil flows through the cylindrical passage 114A formed between the pump chamber 101A and the outer periphery of the pump cylinder 114, further through the communication hole 101B and the open window 105A, then pushes open the leaf valve 104 located at an opposed position and enters the rod-side chamber A. By virtue of a so-called pumping action induced by repetition of this flow, the hydraulic oil is supplied in a successive manner into the rod-side chamber A. Since the hydraulic oil filled into the rod-side chamber A flows also into the antirod-side chamber B through the piston valve PV, the hydraulic oil which enters the inner cylinder 134 flows through a communication hole 127B formed in the base guide, a cutout passage 144B, an oil chamber 144A and a cutaway passage formed on the inner periphery side of the holder 141B, and enters the accumulator oil chamber C.

The hydraulic oil flowing in a successive manner into the accumulator oil chamber C under the pumping action causes a diaphragm 142 to expand outward, so that the gas chamber D is compressed and the internal pressure of the oil chamber C is increased in proportion to the pressure of the compressed gas chamber. Consequently, the internal pressure of the antirod-side chamber B which is in communication with the pressure-increased oil chamber C also increases, and a repulsive force obtained by multiplying the pressure of the antirod-side chamber B by the pressure receiving area of the piston rod 101 overcomes the vehicular body weight, thus causing the piston rod 101 to rise. This pumping action is continued until the upper end of the pump cylinder 114 supported by the piston rod 101 rises and closes the suction port 121C, whereby the vehicular height adjusting device returns to the standard height shown in FIG. 1.

It should be readily clear from the above description that the opening and closing motion of the check ball 128 with vertical movements of the pump rod 121 due to unevenness of the surface of a road is repeated frequently and that therefore the resulting beat noise becomes no longer negligible in the case where the check ball is a steel ball.

In view of this point, in the present invention, the check ball is formed of a non-metallic material such as, for example, hard resin (say polyimide) or hard rubber to not only prevent the generation of the beat noise but also improve the sealing performance.

For adjusting the vehicular height in a gentle manner it is better to enlarge the volume of the gas chamber D and thereby make gentle a change in pressure of the accumulator oil chamber C. However, the longitudinal space conflicts with the space of the reservoir E, so in the present invention the lower end portion of the outer shell 143 is expanded in diameter to solve the problem in question. This expanded-diameter portion indicated at 143D is for increasing the volume of the accumulator gas chamber D, whereby the space present below the suspension spring 147 and corresponding to the outer diameter of the same spring can be utilized effectively, the suspension spring 147 occupying a large space and mounted so as to avoid interference with other suspension members.

As the vehicle is allowed to run at its standard height and the pump rod 121 secured to the outer shell 143 side is moved up and down along unevenness of the surface of a road, the suction port 121C repeats its opening and closing motion with respect to the pump chamber 101A by means of the pump cylinder 114. However, when the suction port 121C is closed, the vehicular height does not rise because there is no pumping action, and therefore the vehicular height is maintained in its standard level.

Figure 2:
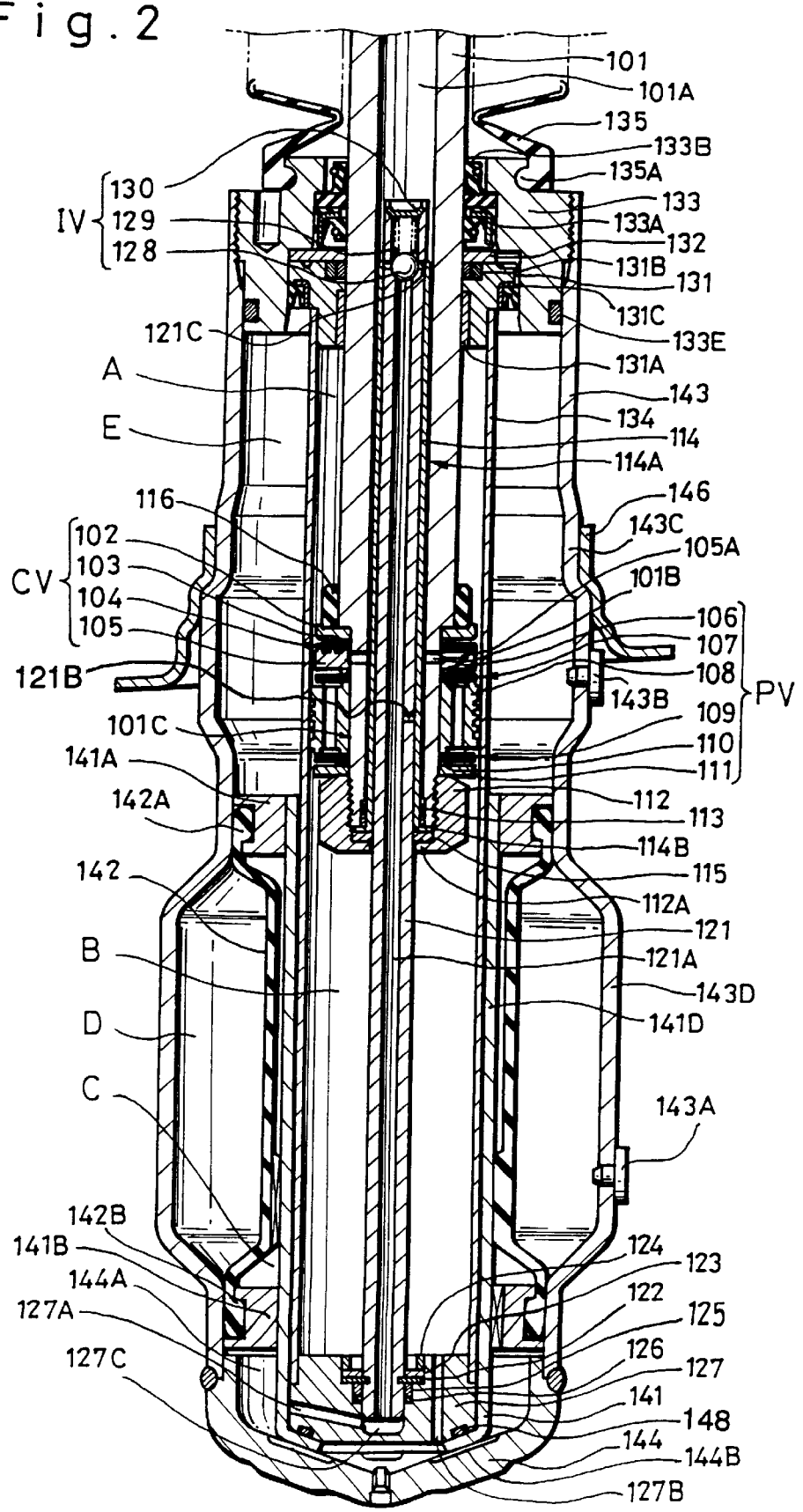
FIG. 2 is an enlarged view of a principal portion of the vehicular height adjusting device of FIG. 1 embodying the present invention.
Figure 3:
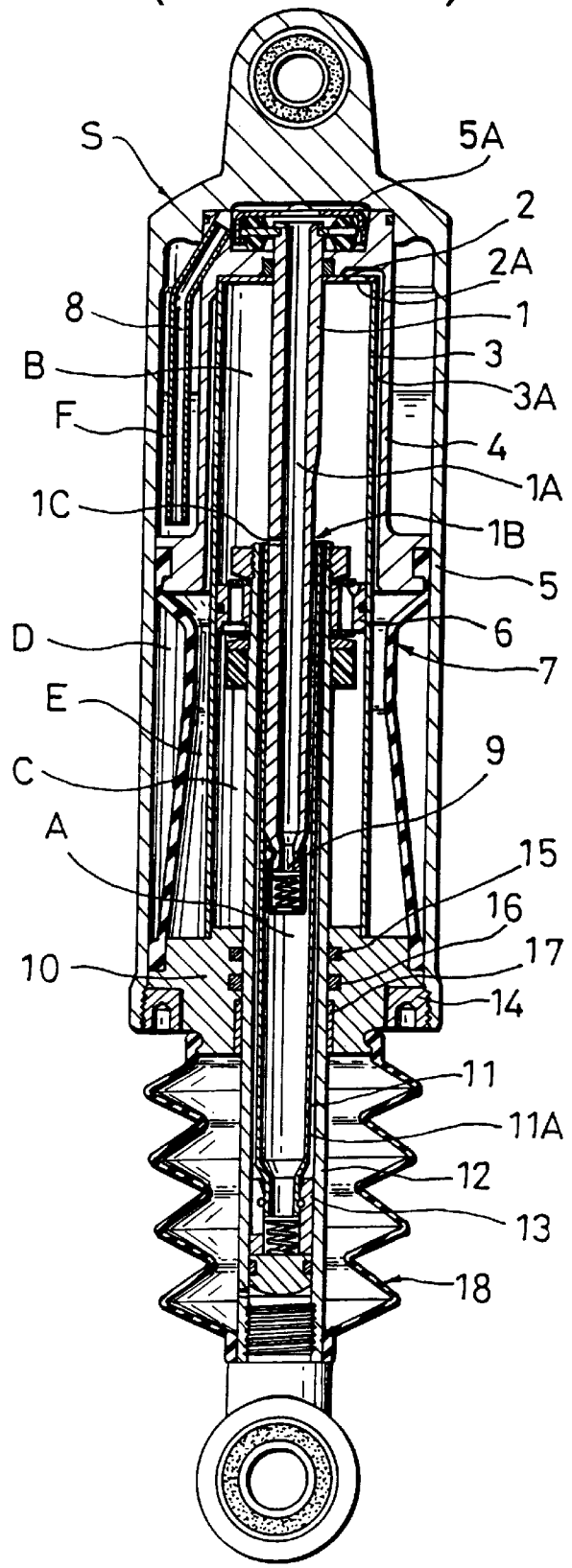
FIG. 3 is a front view in longitudinal section of a conventional vehicular height adjusting device.

In the embodiment of the invention illustrated in FIG. 2, the distance between the suction port 121C and the leveling port 121B is set short relative to the length of the pump cylinder to form a so-called insensible zone which prevents the frequent start and stop of the pumping action even if the vehicular height varies to some extent due to damped vibrations caused by unevenness of the surface of a road.

In this embodiment, moreover, the cutout passage of the pump rod corresponding to the reference numeral 1B in FIG. 2 described above in connection with the prior art is not formed, so it becomes easier to fabricate the pump rod.

Firstly, in the present invention, the space present below the spring seat for the suspension spring 147 and corresponding to the outer diameter of the same spring is utilized effectively, the suspension spring 147 occupying a large space and being mounted so as to avoid interference with other suspension memebers, and the lower end portion of the outer shell 143 is expanded in diameter to increase the volume of the accumulator gas chamber D and thereby diminish a shock caused by a sudden change in pressure of the accumulator oil chamber at the time of vehicular height adjustment, whereby the vehicular height can be adjusted in a gentle manner.

Secondly, since the opening and closing motion of the check ball 128 with vertical movements of the pump rod 121 caused by unevenness of the surface of a road is repeated frequently, the check ball used in the present invention is formed of a non-metallic material such as hard resin (say polyimide) or hard rubber to not only prevent the generation of the beat noise but also improve the sealing performance.

What is claimed is:

1. In a vehicular height adjusting device comprising:
    a shock absorber disposed between the body of a vehicle and an axle;
    an accumulator mounted within the shock absorber and communicating therewith;
    a pump mechanism for supplying pressure oil to the shock absorber and the accumulator; and
    a control orifice formed in the shock absorber to control the height of the shock absorber,
    said shock absorber comprising a cylinder, an outer shell disposed outside the cylinder, a reservoir defined between the cylinder and the outer shell, a hollow piston rod inserted into the cylinder movably through a piston valve, a rod-side oil chamber, and an antirod-side oil chamber, the rod-side oil chamber and the antirod-side oil chamber being partitioned from each other within the cylinder by means of the piston valve,
    said pump mechanism comprising a pump cylinder disposed within the piston rod and a hollow pump rod extending upright from the bottom of the cylinder, the pump mechanism supplying in its extending and retracting operations pressure oil in the reservoir to both a shock absorber-side oil chamber and an accumulator-side oil chamber, and
    said control orifice causing the accumulator-side oil chamber to communicate with the reservoir at a predetermined position to set the shock absorber at a predetermined height,
    the improvement characterized in that an induction valve is mounted at an upper end portion of the pump rod, and said pump mechanism operates in only an area in which a suction port formed on the downstream side of said induction valve is not closed by an upper end portion of the pump cylinder.

2. A vehicular height adjusting device according to claim 1, wherein said induction valve mounted at the upper end portion of the pump rod has a check ball formed of a non-metallic material comprising a hard resin or hard rubber.

3. A vehicular height adjusting device according to claim 1, wherein the outer diameter of an outer shell portion of the shock absorber incorporating the accumulator therein is expanded up to a diameter substantially corresponding to the outer diameter of a suspension spring.

4. In a vehicular height adjusting device comprising:
    a shock absorber disposed between the body of a vehicle and an axle;
    an accumulator mounted within the shock absorber and communicating therewith;
    a pump mechanism for supplying pressure oil to the shock absorber and the accumulator; and
    a control orifice formed in the shock absorber to control the height of the shock absorber,
    said shock absorber comprising a cylinder, an outer shell disposed outside the cylinder, a reservoir defined between the cylinder and the outer shell, a hollow piston rod inserted into the cylinder movably through a piston valve, a rod-side oil chamber, and an antirod-side oil chamber, the rod-side oil chamber and the antirod-side oil chamber being partitioned from each other within the cylinder by means of the piston valve, said pump mechanism comprising a pump cylinder disposed within the piston rod and a hollow pump rod extending upright from the bottom of the cylinder, the pump mechanism supplying in its extending and retracting operations a pressure oil in the reservoir to both a shock absorber-side oil chamber and an accumulator-side oil chamber, and said control orifice causing the accumulator-side oil chamber to communicate with the reservoir at a predetermined position to set the shock absorber at a predetermined height, the improvement characterized in that a base end portion of the pump cylinder inserted into the hollow portion of the piston rod is supported swingably through a plate spring disposed between the lower end surface of the piston rod and a flange portion formed at the lower end of a piston nut which is threadedly engaged with a lower end portion of the piston rod.

5. In a vehicular height adjusting device comprising:

a shock absorber disposed between the body of a vehicle and an axle;

an accumulator mounted within the shock absorber and communicating therewith;

a pump mechanism for supplying a pressure oil to the shock absorber and the accumulator; and a control orifice formed in the shock absorber to control the height of the shock absorber, said shock absorber comprising a cylinder, an outer shell disposed outside the cylinder, a reservoir defined between the cylinder and the outer shell, a hollow piston rod inserted into the cylinder movably through a piston valve, a rod-side oil chamber, and an antirod-side oil chamber, the rod-side oil chamber and the antirod-side oil chamber being partitioned from each other within the cylinder by means of the piston valve, said pump mechanism comprising a pump cylinder disposed within the piston rod and a hollow pump rod extending upright from the bottom of the cylinder, the pump mechanism supplying in its extending and retracting operations a pressure oil in the reservoir to both a shock absorber-side oil chamber and an accumulator-side oil chamber, and said control orifice causing the accumulator-side oil chamber to communicate with the reservoir at a predetermined position to set the shock absorber at a predetermined height, the improvement characterized in that a plate spring is disposed between a collar connected to the outer surface of the lower end of the pump rod which extends upright from a base guide fitted in the cylinder bottom and a stopper connected to an upper end portion of the base guide, to hold the pump rod swingably.

* * * * *